(12) United States Patent
Morovic et al.

(10) Patent No.: US 10,647,138 B2
(45) Date of Patent: May 12, 2020

(54) MULTI-MODULE PRINTER CALIBRATION

(71) Applicant: Hewlett-Packard Development Company, L.P., Spring, TX (US)

(72) Inventors: Peter Morovic, Sant Cugat del Valles (ES); Jan Morovic, London (GB); Jordi Arnabat Benedicto, Sant Cugat del Valles (ES); Hector Gomez Minano, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/326,818

(22) PCT Filed: Oct. 21, 2016

(86) PCT No.: PCT/US2016/058236
§ 371 (c)(1),
(2) Date: Feb. 20, 2019

(87) PCT Pub. No.: WO2018/075070
PCT Pub. Date: Apr. 26, 2018

(65) Prior Publication Data
US 2019/0193441 A1    Jun. 27, 2019

(51) Int. Cl.
*B41J 29/393*    (2006.01)
*B41J 2/21*    (2006.01)
(Continued)

(52) U.S. Cl.
CPC ......... *B41J 29/393* (2013.01); *B41J 2/04558* (2013.01); *B41J 2/155* (2013.01);
(Continued)

(58) Field of Classification Search
CPC ............. B41J 29/393; B41J 2/04558; B41J 2029/3935; B41J 2202/20; G06K 15/027; H04N 1/6033
See application file for complete search history.

(56) References Cited

U.S. PATENT DOCUMENTS

| | | |
|---|---|---|
| 7,339,704 B2 | 3/2008 | Mestha et al. |
| 8,477,374 B2 | 7/2013 | Monga et al. |
| | (Continued) | |

FOREIGN PATENT DOCUMENTS

| | | |
|---|---|---|
| JP | 2008012848 | 1/2008 |
| JP | 2014043084 | 3/2014 |
| WO | WO-2013119206 A1 | 8/2013 |

OTHER PUBLICATIONS

Babaei, V. et al, Reducing the Number of Calibration Patterns for the Two-by-two Dot Centering Model, Jan. 24, 2012, 9 pages.
(Continued)

*Primary Examiner* — Julian D Huffman
(74) *Attorney, Agent, or Firm* — HP Inc. Patent Department

(57) ABSTRACT

An apparatus and method for use in generating calibration parameters for a printing apparatus comprising a plurality of print modules are disclosed. The method comprises printing a first plurality of test patches for each print module of the plurality of print modules, analysing the first plurality of test patches to identify at least two clusters of print modules, wherein each cluster comprises a sub-group of print modules having substantially similar performance, printing a second plurality of test patches comprising an extended calibration test patch set for each cluster of print modules, the second plurality of test patches being distributed across the print modules of the cluster, and analysing extended calibration
(Continued)

test patch set for each cluster to determine a calibration parameter for the printing apparatus.

15 Claims, 6 Drawing Sheets

(51) Int. Cl.
  *B41J 2/045*        (2006.01)
  *B41J 2/155*        (2006.01)
(52) U.S. Cl.
  CPC ...... *B41J 2/2146* (2013.01); *B41J 2029/3935* (2013.01); *B41J 2202/20* (2013.01)

(56) References Cited

U.S. PATENT DOCUMENTS

| | | |
|---|---|---|
| 8,531,731 B2 | 9/2013 | Wu et al. |
| 2005/0160092 A1 | 7/2005 | Mestha et al. |
| 2007/0024647 A1 | 2/2007 | Cowan et al. |
| 2007/0024657 A1 | 2/2007 | Zhang et al. |
| 2008/0297555 A1* | 12/2008 | Cho ............... B41J 2/04573 347/19 |
| 2011/0292477 A1 | 12/2011 | Klassen et al. |
| 2012/0120428 A1 | 5/2012 | Henderson |
| 2012/0133960 A1 | 5/2012 | Henderson |

OTHER PUBLICATIONS

Kuo, Y-F, et al., Calibration Color Patch Reduction and Halftone Level Selection for Electrophotography, Mar. 2013, 22 pages.

* cited by examiner

MULTI-MODULE PRINTER CALIBRATION

BACKGROUND

In order to ensure consistent color reproduction by a printing apparatus on a print media, it is common to perform a calibration process on the printing apparatus. Different technologies are known to implement a printing apparatus, e.g. inkjet printers, offset printing, etc., but all technologies may be subject to drifting away from a calibrated state over time.

BRIEF INTRODUCTION OF THE DRAWINGS

Embodiments of the present invention are further described hereinafter by way of example only with reference to the accompanying drawings, in which.

DETAILED DESCRIPTION OF AN EXAMPLE

Figure 1:
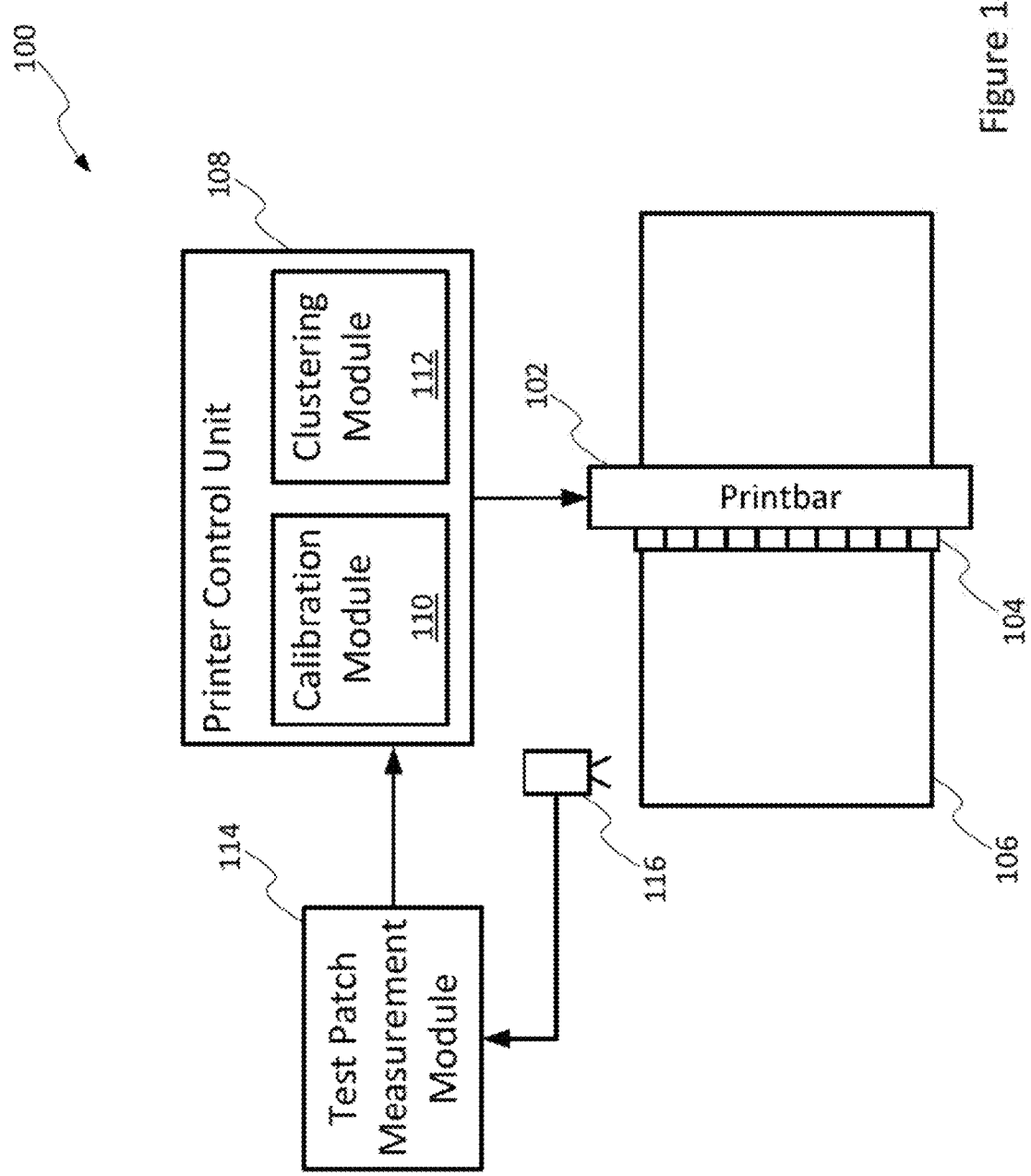
FIG. 1 is a block diagram of an example printing apparatus comprising multiple print modules.

Examples herein provide a method of calibrating a printing apparatus having multiple print modules while reducing the time and print media required to perform the calibration.

In order to ensure consistent output from a printing device, calibration maybe performed on a regular basis. This allows the output of the printer to be compared against a pre-defined reference and adjustments made to correct any discrepancies.

For example, inkjet printers print dots on a print medium by ejecting small drops of ink from one or more nozzles. In order to ensure consistent color reproduction in an image built up on the print medium from a large number of drops of ink, it is important that portions of the image printed by different nozzles have equivalent colorimetry. This can be achieved by ensuring that the amount of ink present in each drop is the same for each drop ejected from all of the nozzles. Alternatively, for print elements that are found to eject smaller drops, the average number of drops ejected by that print element may be increased.

However, the amount of ink present in each ejected drop may vary due to slight differences between nozzles, due to changes in the ink being used, or for other reasons. A calibration process may be performed at regular intervals in order to determine colorimetry of the printer output as compared to a desired reference. The calibration process allows the control signals provided to each nozzle, or portion of a printhead to be adjusted such that the output is corrected for any variation that has occurred. This may be achieved by modifying the control signals directly based on calibration parameters, or by altering the image data to be printed to take account of variations in the response of the nozzles being used to print the image.

Color calibration may be performed by printing and measuring of a set of patches in order to determine the state of a given printer with respect to a pre-defined reference, to be able to then compensate for any changes due to time, usage or environmental conditions. Typically, a test patches of number of shades, for example twelve or more, of each primary color may be printed. In the case of multi-die (for example page-wide-array) calibration, a chart may be printed and measured for each printhead die in order to allow all the dies to be calibrated to the same reference level.

While regular re-calibration of the nozzles in a printer can ensure consistency for colors printed across a print medium, and for a series of print media, performing the calibration process may waste a certain amount of print media and ink.

For a printing apparatus that includes a number of separate print modules, such as a plurality of printhead dies, calibration may be performed for each individual print module to allow the printer to compensate for different changes over time in each print module. For example, a page wide array printer may comprise a number of inkjet printhead dies that experience different levels of use resulting in diverging performance over time, leading to inconsistent reproduction of a printed image across the print media. Similarly, a printing apparatus comprising an analogue offset press with a blade that regulates the amount of ink deposited on a fountain roller and that is adjustable in several locations along the blade could be considered to comprise a plurality of separately calibrated print modules corresponding to the adjustable locations for the blade.

Currently, to perform a calibration for a printer, a predetermined number of test patches may be printed. These test patches may then be analyzed in comparison with a reference level to determine the calibration state of the print module. For a printer including a number of print modules, the predetermined number of test patches should be printed for each individual print module to allow calibration to be performed for each individual print module separately. Thus, for a printer including a large number of print modules, the number of test patches to be printed increases significantly, leading to a relatively large amount of wasted print media and ink, and increasing the time taken to perform the calibration process.

According to some examples, a two stage process is applied to calibrating a printer comprising a number of discrete print modules.

In a first stage of the two stage process, each print module is used to print a small number of initial test patches. The initial test patches are then measured and analyzed to identify modules that behave sufficiently similarly to be considered as equivalent for the purposes of calibration. The print modules can then be divided into clusters of similarly behaving print modules based on the analysis of the initial test patches.

Once the print modules have been assigned to clusters, the calibration process is performed by printing and measuring an extended set of test patches that allow full characterization of the performance of each module. However, the extended set of test patches is printed on a per cluster and not per module basis, such that, if N test patches are required to be printed to perform the calibration, the N patches are spread across the different modules of the cluster which have been identified as performing in an equivalent manner.

For example, for a system with ten print dies/modules, by printing and analyzing a small initial number of patches it may be determined that four behave equivalently, another three behave differently but equivalently among them and finally another three also behave sufficiently similar to be grouped together for analysis purposes. A chart of the extended set of N test patches may then be printed that is spread across three dies for each cluster. For the cluster that includes four dies, three dies may be chosen, for example, based on those closest in performance, or the fourth die may be used to print test patches to be used as a redundant data set. Thus, the total number of test patches to be printed as part of the extended set is reduced from N patches for each module to N patches divided across three modules for each cluster, i.e. the number of patches to be printed and analyzed as part of the extended calibration set is reduced by a third in this example.

In some examples, the measurement of the initial test patch set may indicate that one of the clusters corresponds to dies that have not drifted significantly in color accuracy from a predefined printer-relative reference level. If it is determined that performance of a cluster of print modules corresponds with a printer reference level, it may not be necessary to perform the full calibration process for these print modules, further saving ink and time resources required to perform the calibration.

Examples of the two stage calibration may provide advantages by reducing the amount of data to be printed/measured (less time/waste) and by providing the ability to have redundant data in the calibration chart, thus contributing to more robust measurements.

FIG. 1 illustrates a block diagram of a Page Wide Array (PWA) printer 100. A PWA printer, such as that illustrated in FIG. 1, is a printer comprising an array of nozzles that extends the full width of print media used with the printer, thereby removing the need for a printhead to be scanned laterally across a print medium to form an image. In some examples, the array of nozzles is formed from a plurality of individual dies, each having a plurality of nozzles, arranged on a printbar.

The printer 100 comprises a printbar 102 having a plurality of printhead dies 104, in which a first media sheet 106 is loaded for printing. A printer control unit 108 comprises a processor and a memory including a calibration module 110 and a clustering module 112 comprising instructions that may be executed on the processor. The printer control unit 108 is coupled to the printbar 102 and provides control information to the printbar 102 to control the activation of individual print dies 104 when printing to the print media 106. A monitoring device, such as a camera or spectrophotometer 116, is arranged to measure the properties of test patches printed onto the print media 106 under control of a test patch measurement module 114. The test patch measurement module 114 is coupled to the calibration module 108 to allow the measurements to be fed back for use in the calibration process. In some examples, the test patch measurement module 114 may be a function of the printer control unit 108.

Figure 2:
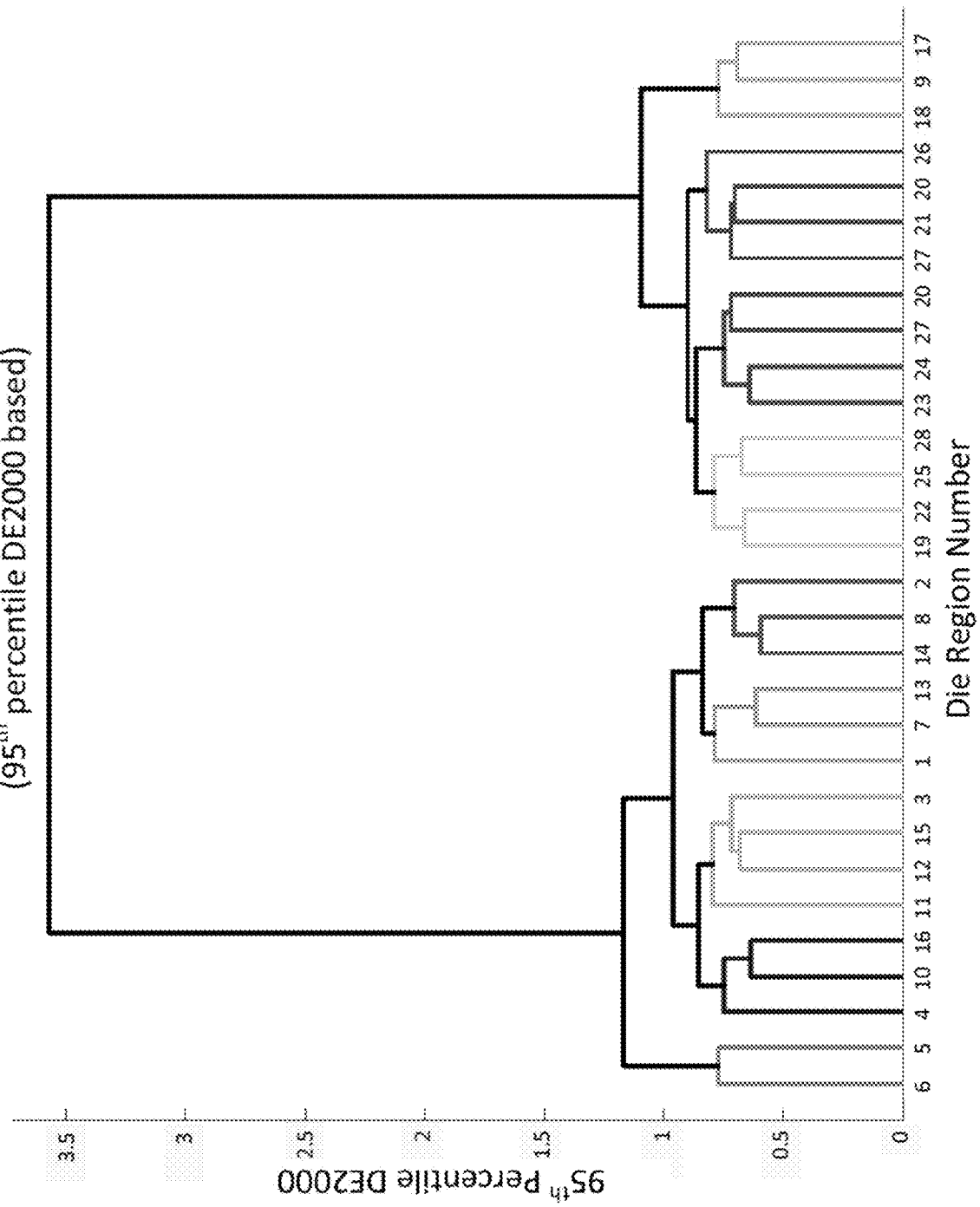
FIG. 2 is a dendrogram of a hierarchical agglomerative cluster tree illustrating clustering of print dies having similar performance according to a 95th percentile CIEDE2000 error between print dies according to an example.
Figure 3:
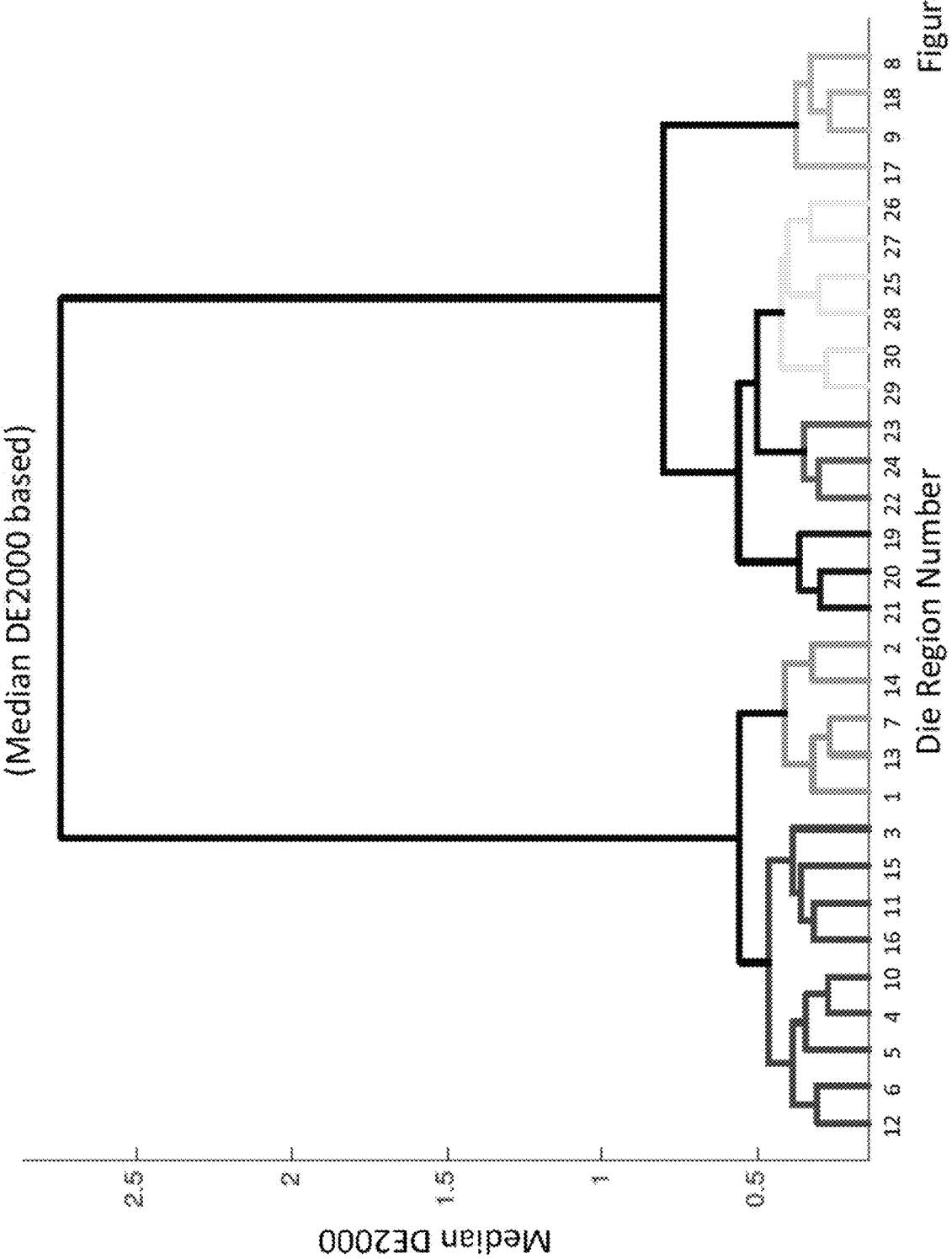
FIG. 3 is a dendrogram of a hierarchical agglomerative cluster tree illustrates clustering of print dies having similar performance according to a median CIEDE2000 error between print dies according to an example.

In operation, the printer control unit 108, the calibration module 110, and clustering module 112 of FIG. 1 may control the print dies 104 to implement a two stage calibration process as outlined in more detail below:

Stage 1: Die-Region Clustering:
  a. Print and measure a small number of patches per die (module), for example k*N+1 where N is the number of inks and k is an integer equal to one or more. These patches can, for example, be the primaries of the system plus the blank substrate for relative reference.
  b. Define a difference metric (for example the International Commission on Illumination (CIE) DE2000 distance metric), statistic (e.g. 95th percentile or median) and cutoff value. These may relate to the print and measure repeatability of a given system such that, for example, if print and measure repeatability of a system is 0.5 median and 0.8 95th percentile (DE2000) then if two sets of data (corresponding to two dies) differ by less than 0.5 DE2000 in median terms or less than 0.8 DE2000 in 95th percentile terms then they are in effect indistinguishable from each other since they differ by at most as much as print and measure repeatability.
  c. Compute a Hierarchical Agglomerative Cluster (HAC) tree based on the chosen metric and statistic and apply the cutoff value. FIG. 2 is an example of such computation, based on 95th percentile CIEDE2000 error between respective die-regions with a clustering cut-off of 0.8. As can be seen in FIG. 2, the HAC tree terminates in a number of print module clusters wherein print modules in a single cluster differ among themselves by at most the cutoff value, in terms of the statistic over the metric. FIG. 3 illustrates a similar example based on the median CIEDE2000 error between respective die-regions with a clustering cut off of 0.5.

In examples, computation of the HAC tree is performed by clustering module 112 based on measurements of the initial test patch set provided by the test patch measurement module 114.

In some examples, if a predetermined reference performance level was set on the printing system by printing and measuring the nominal state of the dies (i.e. the state that needs no calibration) then a cluster that aligns with the reference state corresponds to a cluster of dies/regions that may need no calibration and can be either ignored for the second stage of calibration, or used for control data. In some cases calibration changes all dies/regions, in this case this option does not apply.

In other examples, other metrics and/or clustering methods may be used to determine clusters of similar print dies.

Figure 4A:
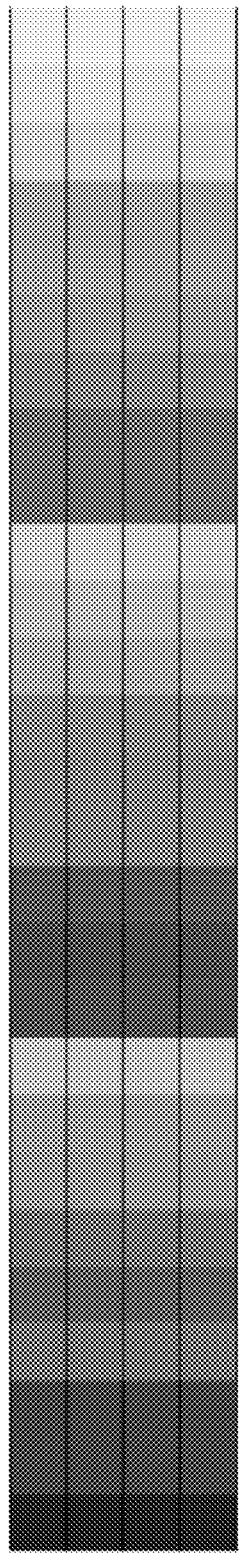
FIG. 4a is an example extended calibration chart for print modules not employing clustering.
Figure 4B:
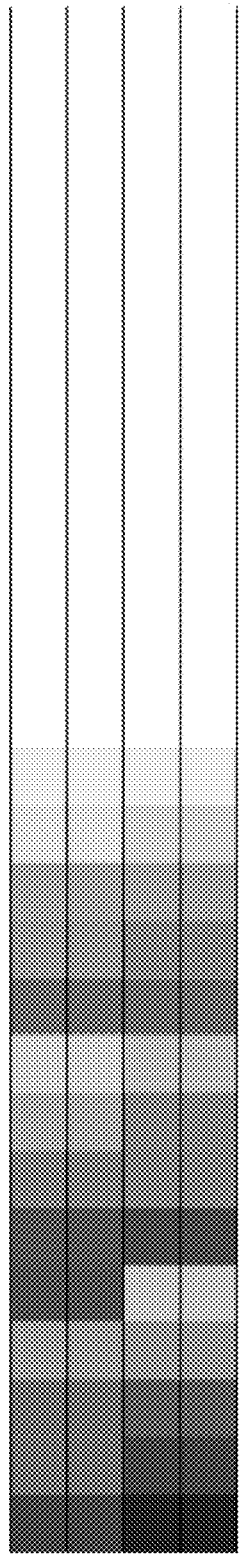
FIG. 4b is an example extended calibration chart for print modules employing clustering according to some examples.

Stage 2: Die-Redundant Calibration
  a. Given the above clustering of dies or regions, a calibration chart is built. This is independent of the type of pipeline (Halftone Area Neugebauer Separation (HANS) or ink-channel based) as well as the calibration approach (whether Closed-loop-color, RGB→RGB 3D calibration or Neugebauer Primaries area coverage (NPac)→NPac calibration, etc.).
  b. Given a set of M patches each having a target color value to be used for the calibration, for every cluster of dies/modules the M patches are distributed among the dies that are within a cluster. For example, FIG. 4*a* illustrates a calibration chart for a system with 4-dies and a calibration approach based on the printing and measurement of 27 patches where for each of the 4 dies all 27 patches are printed and measured. Instead, if these dies have been clustered into two categories such that dies 1 and 3 and dies 2 and 4 respectively belong to the same clusters (i.e. based on the initial test patch set dies 1 and 3 are indistinguishable up to print and measurement repeatability) then the chart can be printed such that the 27 patches are distributed among the dies within the same cluster as illustrated in FIG. 4*b*.

c. The result is a smaller calibration chart which in this example saves 50% of the original calibration chart paper waste (and measurement time). In case of clusters of varying size, the smallest size determines the saving, while the larger clusters can be used for redundant printing/measurement leading to more robust data.

Analysis of the printed calibration chart comprising the extended test patch set may then be performed by the calibration module 108 based on measurements of the extended test patch set provided by the test patch measurement module 114. This analysis may result in calibration parameters being determined separately for each cluster of print modules identified by the clustering module 112 as an output of the first stage of the calibration process.

Figure 5:
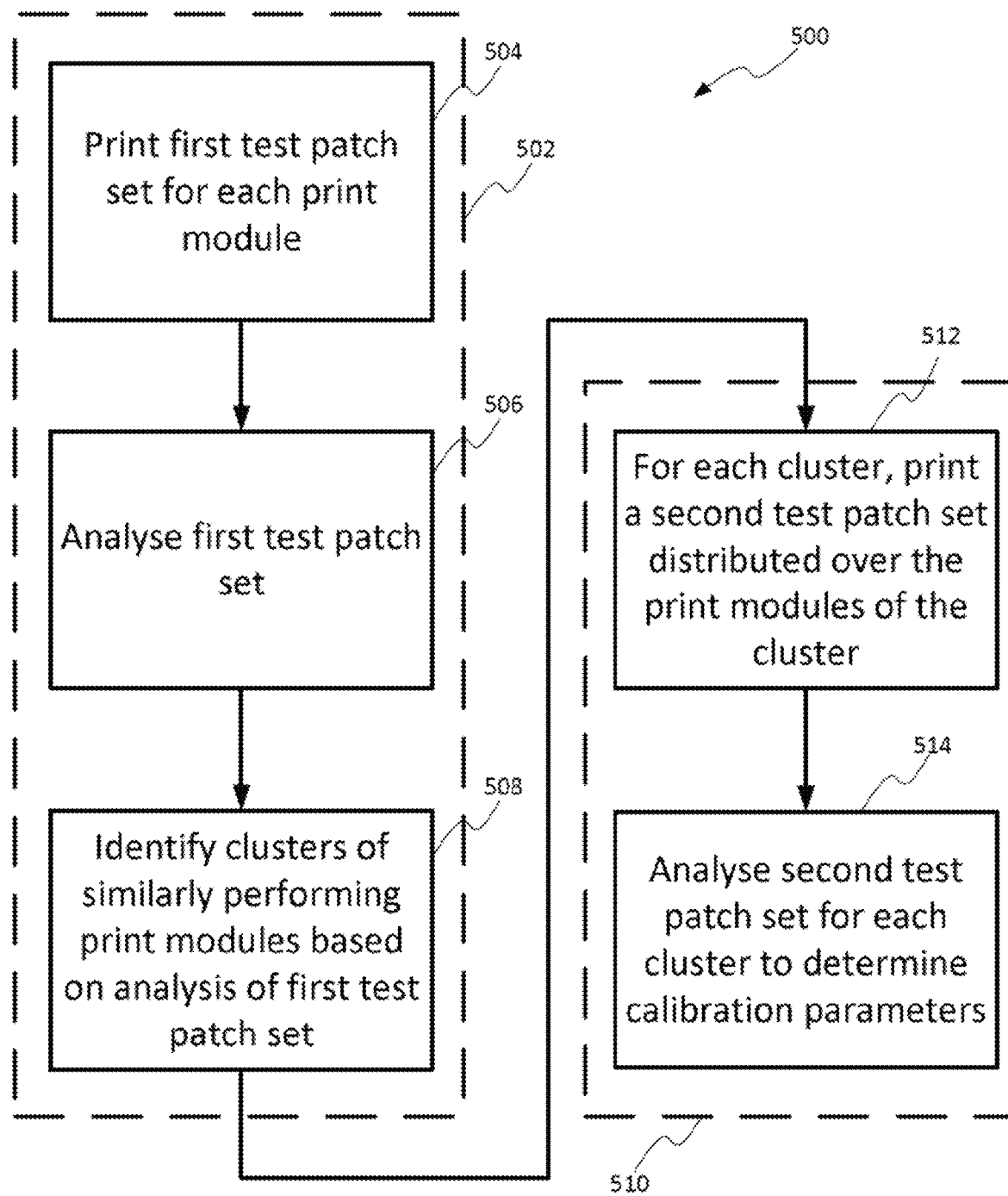
FIG. 5 illustrates a method of calibrating a printing apparatus comprising multiple print modules according to an example.

FIG. 5 illustrates a method of performing a two stage calibration process according to examples that may be implemented on a printing device as shown in FIG. 1. According to the method 500 of FIG. 5, in a first stage 502 a first, initial test patch set of a relatively small number of patches per print module is printed 504 for each print module or die 104. For example, the initial test patch set may comprise a test patch for each primary color of the print die and a blank control patch. The first test patch set is then analyzed 506 to identify print modules having substantially identical performance. The print modules can then be grouped into clusters 508 of similarly performing print modules based on the analysis of the first test patch set.

According to some examples, a hierarchical agglomerative clustering approach is taken to determining the clusters of similarly performing print modules. In this approach, the measurements of the initial test patch set for each print module may be evaluated by the clustering module 112 to calculate a distance metric, for example based on the International Commission on Illumination (CIE) DE2000 distance metric, between the measured performance and a predetermined reference performance for the print modules. The hierarchy may then be progressively built from the individual data points associated with the print modules by progressively merging clusters based on the distance metric.

For example, in a first stage the two closest elements, according to the chosen distance metric are merged to form a cluster. At each subsequent iteration, the next two nearest elements or clusters are merged until a certain number of clusters is reached, or a distance between the clusters exceeds a certain value.

Once the HAC tree has been generated a cutoff value for the distance metric can be applied to determine the print module clusters to be used for the second calibration stage 502.

In the example HAC tree of FIG. 2, based on the 95$^{th}$ percentile CIEDE2000 difference metric, pairs of elements and then clusters can be seen to be combined to generate the tree. Applying a cutoff value of 0.8 results in clusters comprising die regions 6 and 5; 4, 10, and 16; 11, 12, 15, and 3; etc.

In some examples, another difference metric may be used to generate a HAC tree, such as a median CIEDE2000 difference value as illustrated in FIG. 3.

In a second stage 510, an extended test patch set is printed 512 for each of the clusters identified in the first stage, with the number of test patches in the extended set distributed over the modules of each cluster. The extended test patch set is then analyzed 514 to determine a difference between the actual output of the print modules of the cluster and the desired calibrated output to allow calibration parameters to be determined for each cluster.

Once the calibration parameters have been determined, the printer control unit 108 may apply the calibration parameters when providing control signals to the printbar 102 when printing an output image to the print media 106.

Figure 6:
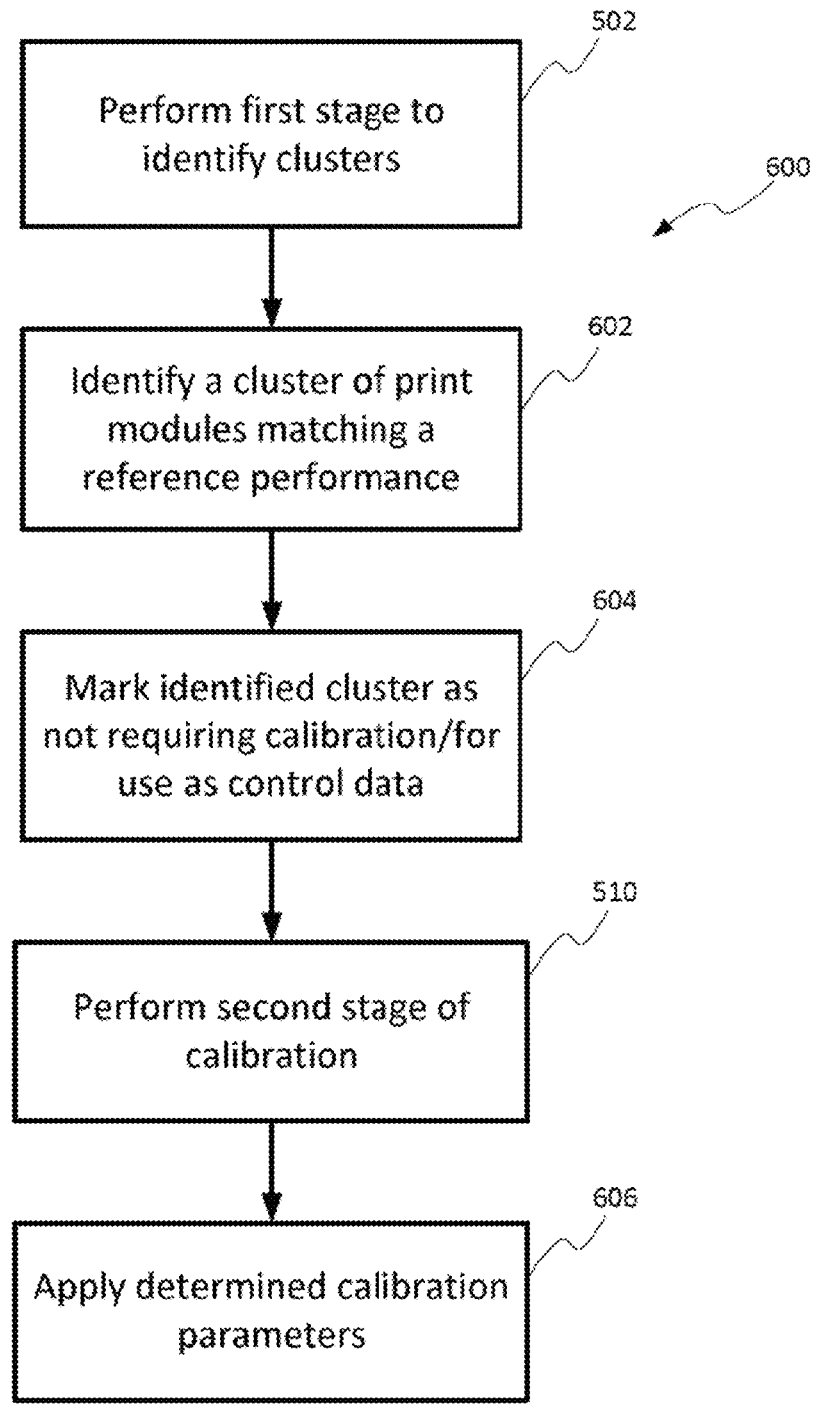
FIG. 6 illustrates a method of calibrating a printing apparatus comprising multiple print modules according to an example.

FIG. 6 illustrates a method 600 according to further examples. According to the method of FIG. 6, following the identification of print module clusters in the first stage 502 of the method of FIG. 5, a cluster of print modules having a performance that substantially matches a predetermined reference performance level (i.e. a calibrated state of the printing apparatus) is identified 602. The identified cluster may then be marked 604 as not requiring calibration in the second stage 510 of the calibration process. The print modules of the marked cluster may then be ignored during the second stage, not requiring any test patches to be printed for that cluster, or may be used to provide further reference control data for comparison with the clusters of print modules still to be calibrated.

The second stage of the calibration process may then be performed 510 taking into account any cluster of print modules marked as not requiring calibration. The calibration parameters determined based on the second test patch set may then be applied 606 to the printing apparatus to provide a calibrated output.

While examples have been described in the context of a PWA printer, other examples may be suited to use with any printing device that includes number of individual print modules or dies requiring separate calibration.

Examples described herein may be implemented into a printing apparatus using any suitably configured hardware and/or software. For example, printer control unit 108 may comprise one or more processing resources operable to execute instructions stored in a memory and configured to implement the calibration method described above.

In the above disclosure, the determination of calibration parameters for the print modules has been discussed. The person skilled in the art will understand that the application of the calibration parameters may take the form of a mathematical procedure (such as an algorithm or Look-Up-Table) applied to data representing image color or a quantity of ink to be applied for a pixel. In another example, the calibration parameters may affect physical control signals applied to a specific nozzle, for example a voltage, time or intensity of a control signal applied to a nozzle.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of calibrating a printing apparatus comprising a plurality of print modules, the method comprising:
    printing a first plurality of test patches for each print module of the plurality of print modules;
    analysing the first plurality of test patches to identify at least two clusters of print modules, wherein each cluster comprises a sub-group of print modules having substantially similar performance;
    printing a second plurality of test patches for each cluster of print modules, the second plurality of test patches being distributed across the print modules of the respective cluster, and
    analysing the second plurality of test patches for each cluster to determine a calibration parameter for the printing apparatus.

2. The method of claim 1, wherein said second plurality of test patches comprises a greater number of test patches than the first plurality of test patches.

3. The method of claim 1, wherein analysing the first plurality of test patches to identify at least two clusters of print modules comprises:
    determining a difference metric for each print module of the plurality of print modules based on the analysis of the first plurality of test patches.

4. The method of claim 3, further comprising determining two or more print modules to have substantially similar performance based upon difference metrics for each of the two or more print modules differing by less than a threshold difference value.

5. The method of claim 4, wherein the threshold difference value corresponds to a print and measure repeatability level of the print module.

6. The method of claim 1, wherein printing a first plurality of test patches for each print module of the plurality of print modules further comprises, for each print module printing one test patch for each primary ink of the print module and one blank substrate reference patch.

7. The method of claim 1, further comprising determining a further cluster of print modules performing substantially similar to a reference performance level based on the analysis of the first plurality of test patches.

8. The method of claim 7, further comprising one of:
    refraining from printing a second plurality of patches for the further cluster of print modules; or
    printing a second plurality of test patches distributed across the further cluster of print modules for use as control data.

9. The method of claim 1, wherein the printing apparatus comprises a page wide array and wherein the plurality of print modules comprises a plurality of print dies forming the page wide array.

10. The method of claim 1, wherein the second plurality of test patches comprises a predetermined number of test patches each test patch in the predetermined number of test patches having a target colour value; and wherein distributing the second plurality of test patches across the print modules of the cluster further comprises printing and dividing the predetermined number of test patches between the print modules of the cluster.

11. The method of claim 1, wherein analysing the second plurality of test patches for each cluster to determine a calibration parameter for the printing apparatus comprises determining for each of the at least two clusters a cluster calibration parameter, each cluster calibration parameter to be applied to all print modules in an associated cluster.

12. A memory resource storing instructions that when executed cause a processing resource at a printing apparatus to effect a calibration process, the instructions comprising:
    a print module to print a first plurality of test patches for each print module of a plurality of print modules of the printing apparatus;
    a test patch measurement module to measure a color value associated with each of the first plurality of test patches;
    a clustering module to identify at least two clusters of print modules based on the measured color values, wherein each cluster comprises a sub-group of print modules having substantially similar performance;
    the print module further to print a second plurality of test patches comprising a predetermined number of shades for each primary color for each cluster of print modules, the second plurality of test patches being distributed across the print modules of the respective cluster, and
    a calibration module to analyse the extended calibration test patch set for each cluster to determine a calibration parameter for the printing apparatus.

13. A printing apparatus comprising:
    a plurality of print modules; and
    a controller coupled to the plurality of print modules, the controller to:
    cause the plurality of print modules to print a first plurality of test patches;
    determine a difference metric for each print module compared to a reference print module based on the printed first plurality of test patches;
    identify at least two clusters of print modules based on the determined difference metrics, wherein each cluster comprises a sub-group of print modules having substantially similar performance;
    cause each cluster of print modules to print a second plurality of test patches, the second plurality of test patches comprising a predetermined number of test patches, each print module of a cluster printing a subset of the predetermined number of test patches of the second plurality of test patches; and
    analyse the second plurality of test patches for each cluster to determine a calibration parameter for the printing apparatus.

14. The printing apparatus of claim 13, wherein the printing apparatus comprises a page wide array and wherein the plurality of print modules comprises a plurality of print dies forming the page wide array.

15. The printing apparatus of claim 13, wherein the controller is further to:
    determine a difference metric for each print module of the plurality of print modules based on the analysis of the first plurality of test patches; and
    determine the two or more print modules to have substantially similar performance based upon difference metrics for each of the two or more print modules differing by less than a threshold difference value.

* * * * *